3,286,749
FASTENER TOOL WITH FASTENER
ENGAGING MEANS
Howard K. Learned, 3825 N. Hillside, Wichita, Kans.
Filed Aug. 28, 1964, Ser. No. 393,487
1 Claim. (Cl. 145—50)

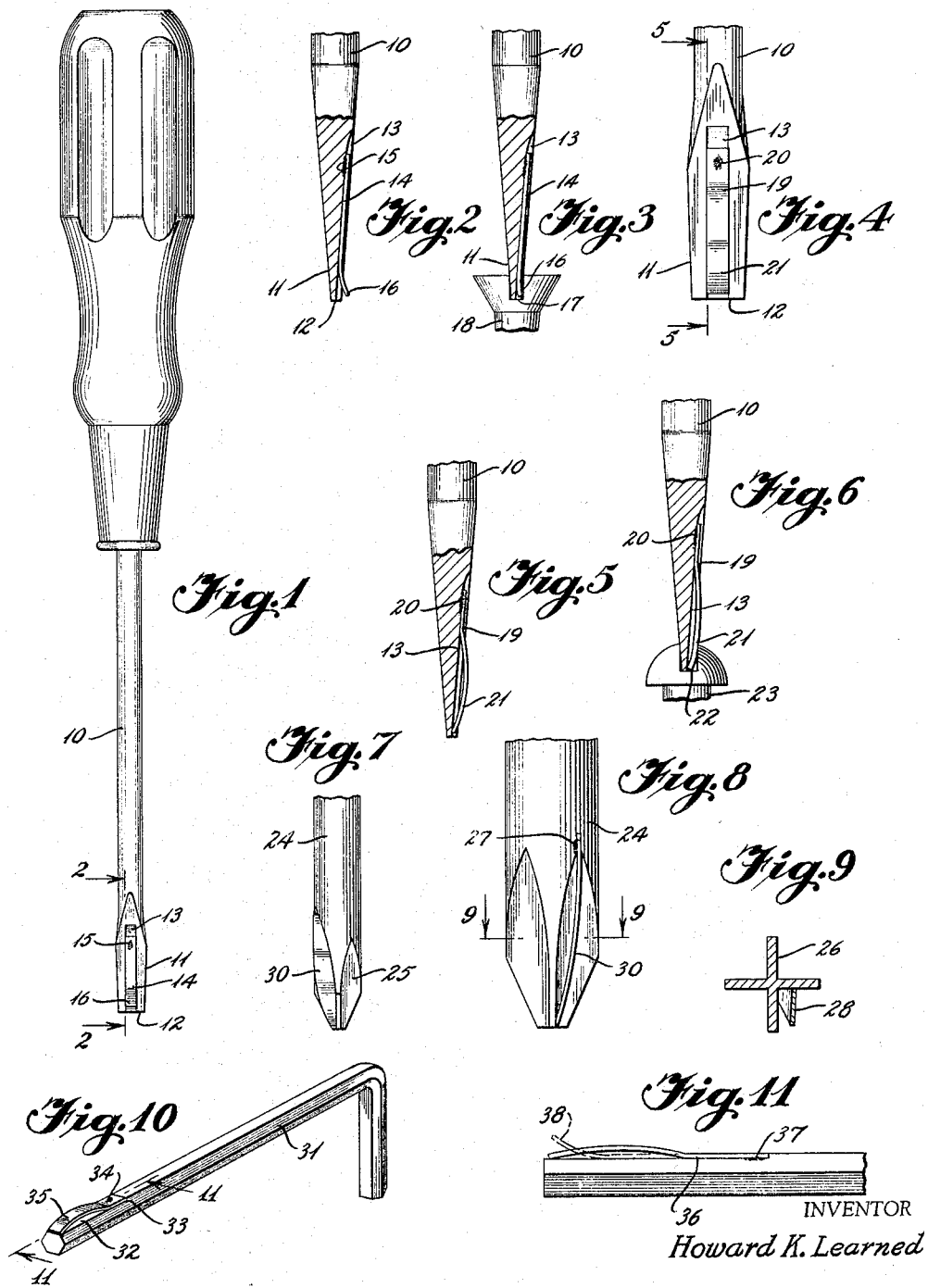

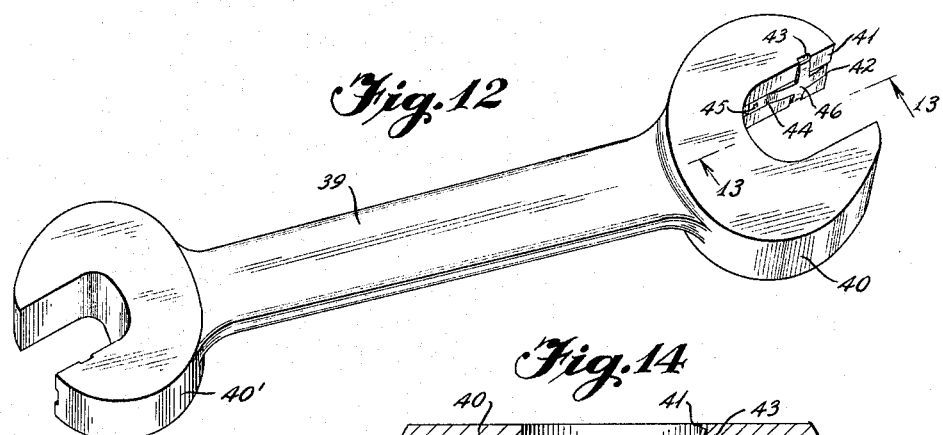
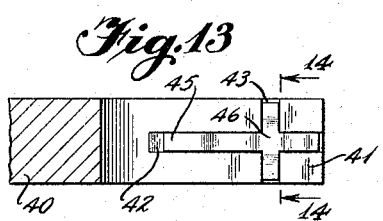
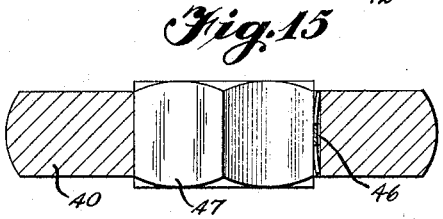
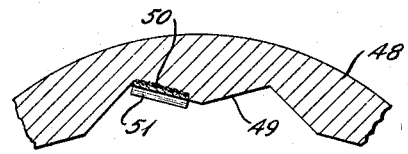
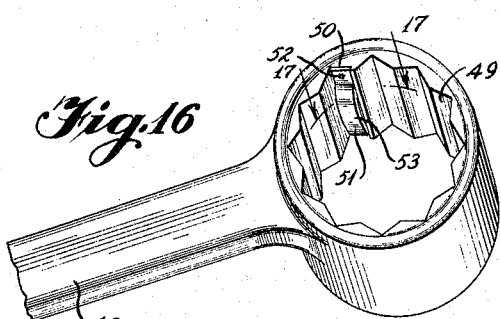
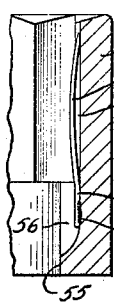
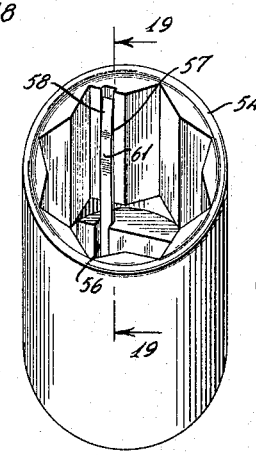
INVENTOR
Howard K. Learned
BY
ATTORNEY

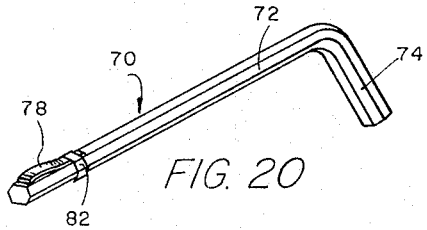
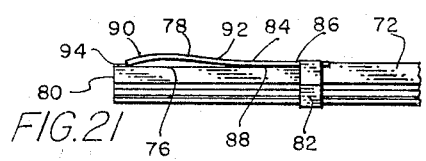
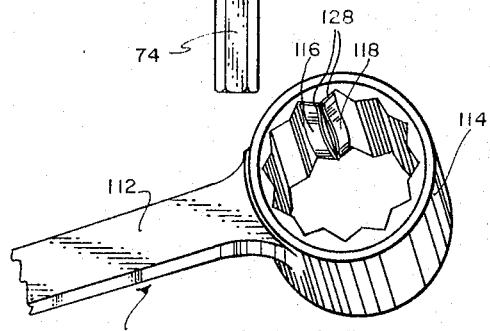
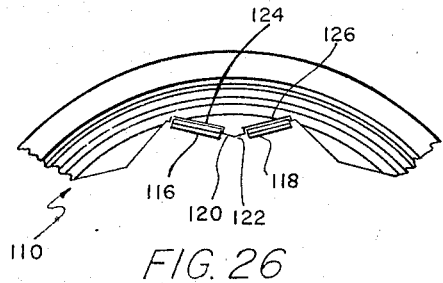
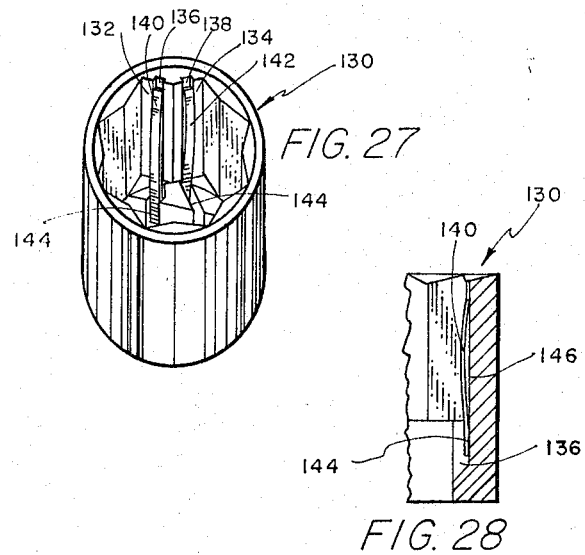
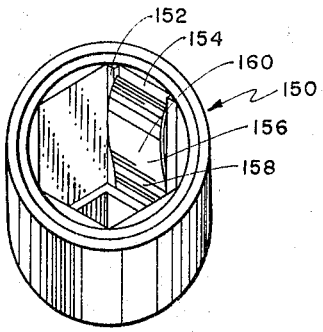
INVENTOR.
HOWARD K. LEARNED

# United States Patent Office 3,286,749
Patented Nov. 22, 1966

This application is a continuation-in-part of my copending application for U.S. Letters Patent Ser. No. 13,024, filed Mar. 7, 1960, and now abandoned, and entitled Screw and Nut Holder for Screw Driver or Wrench. The entire disclosure of such copending application is incorporated in this application by reference.

This invention relates to fastener element tools such as screwdrivers, wrenches, sockets and the like employed for use in applying torque to threaded fastening elements such as screws, nuts or the like provided with means for retaining the tool in operative relation to a fastening element, and more particularly the invention pertains to such a tool wherein such means comprises an arcuate leaf spring fixed to the tool in a special relationship to a face of the tool that either engages the fastening element or is spaced from the fastening element by the spring.

The invention relates particularly to screwdrivers and wrenches (the latter having reference to wrenches that are engageable with fastening elements having cylindrical surfaces of regular polygon transverse section of both the internal and external types) having means for retaining screws, nuts or other fastening elements attached thereto and including spring means for exerting pressure laterally against the fastening element to hold the same in place relative to the tool.

Fastener element tools provided with means for retaining a fastener element in operative relation therewith have heretofore been proposed; however, such devices have been unreliable in operation, either excessively difficult to attach to or disengage from a fastener element, and otherwise complicated or impractical. Such tools as have heretofore been proposed such as to include a spring have incorporated such spring in a manner that the force required to displace the spring has been substantially linear (or involve flexure of the spring about a fixed fulcrum point or pivot) with the consequence that if spring displacement is to be minimized an excessive spring stiffness was necessitated, for otherwise a minor spring displacement would result in production of an insufficient securing force. Excessive spring stiffness and/or flexure about a fixed point not only can contribute to early fatigue of the spring, but more importantly may greatly increase the difficulty encountered in attaching the fastening element to the tool.

Accordingly, the primary object of the present invention is to overcome the difficulties mentioned above, and especially to provide a spring holding means such that the force required to displace the spring against its resiliency increases at a rate that is not linear, but which rate progressively and smoothly increases during such displacement.

Another object of the invention is to produce a tool of the character above specified that is or can be of integral construction that will be reliable and easy to use, and which will be extremely durable notwithstanding repeated use, and which will be inexpensive and simple to manufacture.

Briefly stated, the invention is a spring clip for application to a screwdriver of the straight or Phillips type, or to an internal or external wrench and in each instance the spring clip is countersunk or disposed at a position below the level of the normal tool engaging surface of the face with which the same is employed, so that when compressed it is flush with the surface of the fastening element against which the same is biased.

A broad aspect of certain embodiments of the invention has to do with a tool for applying torque to elements such as screws, nuts, bolts and the like, wherein the tool includes a face adapted for engagement with the element and wherein the tool is provided with a free-ended and elongated arcuate spring recessed in or disposed in a groove in the face of the tool and is resiliently flexible from a position of repose such that the free end of the spring projects above the face to a position substantially flush with the face during which flexure of the spring the nearest point of contact of the spring with the bottom of the recess or groove moves progressively and continuously toward the free end of the spring, whereby the force necessary to urge flexure of the free end of the spring from its position of repose varies at a nonlinear rate that smoothly and progressively increases.

A somewhat narrower aspect of the invention defined in the preceding paragraph involves an integral extension of the spring at the free end thereof that is also resilient and which is smoothly curved as an extension to extend into and abut at the free end of the extension against the bottom of the groove, such extension thereby serving to augment the resilient resistance offered by the spring to being flexed into position entirely within the groove or flush with the face of the tool. In this aspect of the invention, it is important and especially preferred that the spring be pretensioned in its attachment to the tool so as to bias and prestress the free end of the extension against the tool.

Other objects, features, aspects and advantages of the invention will become apparent during the following description of preferred embodiments of the invention taken in conjunction with the accompanying drawings illustrative thereof, wherein:

FIGURE 1 is a side elevation illustrating the application of the invention to a screwdriver;

FIGURE 2 is an enlarged fragmentary section on the line 2—2 of FIGURE 1;

FIGURE 3 is a view similar to FIGURE 2 illustrating the device with a screw attached;

FIGURE 4 is a view similar to but at right angles to that of FIGURE 2 of a modified type of clip;

FIGURE 5 is a sectional view taken at right angles to the view of FIGURE 4 on the line 5—5 of FIGURE 4;

FIGURE 6 is a view similar to FIGURE 5 with a screw attached;

FIGURE 7 is a fragmentary side elevation of the tip of a Phillips type of screwdriver with the invention applied thereto;

FIGURE 8 is a similar view enlarged and at right angles to that of FIGURE 7;

FIGURE 9 is a transverse section on the line 9—9 of FIGURE 8;

FIGURE 10 is a perspective of an Allen-type wrench with the invention applied thereto;

FIGURE 11 is an enlarged view taken at right angles to the line 11—11 of FIGURE 10;

FIGURE 12 is a perspective of an open end wrench with a modified form of the invention applied thereto;

FIGURE 13 is a transverse section on the line 13—13 of FIGURE 12;

FIGURE 14 is a section on the line 14—14 of FIGURE 13;

FIGURE 15 is a view similar to FIGURE 14, but with the wrench applied to the nut;

FIGURE 16 is a fragmentary perspective view of a 12-point box wrench with the invention applied thereto;

FIGURE 17 is a fragmentary section on the line 17—17 of FIGURE 16;

FIGURE 18 is a perspective of an 8-point socket wrench with the invention applied thereto;

FIGURE 19 is a section on the line 19—19 of FIGURE 18;

FIGURE 20 is a perspective view of a modified form of Allen wrench according to the invention, wherein the lateral spacing of the spring from the tool is slightly exaggerated for purposes of illustration;

FIGURE 21 is an enlarged fragmentary elevational view of the screw engaging end of the Allen wrench shown in FIGURE 20;

FIGURE 22 is an enlarged end view of the fastener engaging end of the wrench shown in FIGURE 20, with a portion of the handle being broken away;

FIGURE 23 is a side elevational view of the spring element employed in the form of wrench shown in FIGURES 20, 21 and 22, wherein the lateral spacing of the spring from the tool is slightly exaggerated for purposes of illustration;

FIGURE 24 is an enlarged sectional detail view illustrating the manner of engagement of the wrench shown in FIGURES 20, 21 and 22 with an Allen screw;

FIGURE 25 is a broken perspective view of a modified wrench according to the present invention;

FIGURE 26 is a broken top elevational view on an enlarged scale of the spring equipped portion of the wrench shown in FIGURE 25;

FIGURE 27 is a perspective view of a modified socket according to the present invention;

FIGURE 28 is an enlarged sectional detail view of the socket shown in FIGURE 27; and, FIGURE 29 is a perspective view of a socket for use with hexagonal nuts according to the invention.

Referring now to the drawings, wherein like numerals designate like parts throughout the various views, attention is initially detected to the form of the invention shown in FIGURES 1 through 4 wherein a screwdriver is shown having a shank 10 with flat faces 11 terminating in a blunt end 12 provided along one of such flat faces with a groove 13 for the receipt of a fastener binding and holding spring 14 secured by any suitable fastening means such as a spot weld 15 adjacent its front end in the groove 13. The lower end of the spring 14 is provided with an outwardly turned portion 16, such spring 14 being of the leaf type so that the spring will engage and bear against the side of a screwdriver slot 17, FIGURE 3, in the head of a screw 18 and retain the screw on the end of the screwdriver. The slot 13 in which the spring 14 is received is of a length and depth to accommodate the spring 14 within the same so that the only portion of the spring which extends above the slot or groove 13 is the outwardly turned or curved extremity 16 as shown in FIGURE 2.

As is clearly apparent on inspection of FIGURES 2 and 3, the bottom of the slot or groove 13 is continuous and entirely free of any sharp irregularities for the extent thereof that corresponds to the linear extent of the spring 14. In the preferred form of the invention the bottom of the slot or groove 13 is substantially straight for the extent thereof that corresponds to the length of the spring 14.

The spring 14 is preferably rectangular in transverse section, and the slot or groove 13 is of a similar transverse configuration throughout the extent thereof that is adjacent the spring 14.

It is particularly important to note that the portion of the spring 14 immediately adjacent to the curved portion 16 is seated flush against the bottom of the slot or groove 13 when the spring is in a position of repose such as shown in FIGURE 2, and that the portion 16 of the spring 14 smoothly curves away from a position of tangency with the bottom of the groove 13. The arrangement is such that as the free outer end of the curved portion 16 of the spring 14 is depressed into or towards the groove 13, the curved portion 16 of the spring 14 tends to roll down flat upon the bottom of the groove 13 in a manner such that the point of tangency and contact of the spring with the bottom of the groove 13 tends to move nearer to the free end of the curved portion 16 of the spring 14, whereby the force required to cause such displacement of the free end of the spring 14 increases at nonlinear rate. Such increase in rate approximates an expediential increase as the free end of the spring 14 approaches the bottom of the groove 13. This action results in the important advantage of the free end of the spring 14 being initially easy to displace toward the groove 13 for any desired degree of force that may be necessary to force the curved end 16 of the spring 14 into or substantially entirely within the groove 13. Such relation between the forces required to initiate the movement of the free end of the spring and the force exerted upon the spring tip or end 16 when the latter is in a position such as shown in FIGURE 3 substantially facilitates the ease with which the tool can be engaged within the kerf of a screw as shown in FIGURE 3. Furthermore, such action enables the use of springs of lesser thickness and/or stiffness, whereby an excessively short service life such as may be occasioned by fatigue of the metal of the spring 14 may be avoided.

It is also to be noted that while the position of the spot weld 15 is shown to be substantially remote from the position of the curved portion 16 of the spring 14, it will be appreciated that such point of attachment can be positioned much closer to the curved portion 16 than shown in FIGURES 1 through 4, it being only necessary that the spring be retained in a position seated flush against the bottom of the groove 13 immediately adjacent the curved portion 16 of the spring 14. Indeed, the position of attachment 15 is preferably positioned sufficiently close to the curved portion 16 of the spring 14 that no portion of the spring 14 intermediate the position of attachment 15 and the curved portion 16 will be displaced outwardly from engagement with the bottom of the groove 13 when the tool is engaged such as shown in FIGURE 3 with a fastening element. If desired, as may be necessary or expedient when the securing means 15 is remote from the curved portion 16 in order to prevent bowing of the spring from the tool on engaging the latter with a screw, the extent of the spring seated against the bottom of the groove can be prestressed against the latter. This can easily be accomplished by this extent of the spring being concave toward the tool prior to pressing the spring against the tool and welding at 15.

From the foregoing, it will be seen that the screw driver shown in FIGURES 1 through 4 can be easily engaged with the kerf of a screw and yet afford a sufficiently secure engagement that there is little likelihood of inadvertent disengagement. Also, it is to be expressly noted that inasmuch as the slot or groove 13 is closely adjacent to the neutral axis of the screwdriver, there is only an immaterial reduction in the maximum torque that can be applied by the screwdriver to a fastening element without breakage. Additionally, it will also be evident upon inspection of FIGURE 3 that the curved portion 16 of the spring 14 is positioned in such a manner as to be protected against permanent deformation and resultant loss in holding power, and that by virtue of occupying such a sheltered position and also by virtue of being near the neutral axis of the screwdriver, the curved portion 16 of the spring 14 is not subjected to any significant part of the force acting between the screwdriver and the screw as a consequence of applying a torque to the screw.

Instead of a spring of the configuration disclosed in FIGURES 1 through 3, a spring 19 such as that disclosed in FIGURES 4, 5 and 6 can be employed, such spring being secured by a weld 20 in the slot 13, such spring having an outwardly bowed portion 21 for engaging the screwdriver slot 22 in the head of a screw 23. The spring 19 may be used where the screwdriver slot is of sufficient depth to enable the side of the same to be engaged by the curved portion 21 of the spring. With either of the two springs disclosed, the screw and screwdriver are adapted to be held in contact one with the other regardless of whether the curvature is outwardly or inwardly.

In FIGURES 7, 8 and 9 there is disclosed an internal or Phillips head screwdriver comprising a shank 24 with a series of grooves 25 providing a series of ribs or flutes 26 for complementary engagement with a Phillips screw (not shown) of conventional construction.

In the execution of the invention the shank 24 is provided with a groove 27 of a length and size for the reception of a leaf spring 28 secured by welding within such groove, the spring having an outwardly bowed portion 30 adapted to engage the socket within the screw and function similarly to the spring 19 of FIGURES 4 through 6.

In FIGURE 10 there is disclosed another internal tool in the form of an Allen type of wrench 31 having a groove or milled portion 32 of a length and depth to accommodate the leaf spring 33 fastened therein by welding 34 and with such leaf spring having an outwardly bowed portion 35 for applying pressure and maintaining the Allen wrench in contact with the screw to which it is applied. Instead of the spring having an outwardly bowed portion with its extremity curving inwardly as illustrated in FIGURE 10, a spring 36, FIGURE 11, may be attached by welding 37 and such spring may have an outwardly curved extremity 38, the springs of FIGURES 10 and 11 being intended to function as in the embodiments of the preceding figures.

While it is only essential that one of the faces of the Allen wrench be provided with a spring as hereinbefore described, it will be evident to those skilled in the art that two or more of the faces may be similarly equipped with springs. Indeed, all of the faces of the Allen wrench may be so equipped; however, this is not preferred. Assuming that a conventional Allen wrench of six sides is to be employed, it is preferred that if more than one spring is used they be on sides adjacent or near each other although any combination can be made for special reasons.

With respect to the embodiment of the invention shown in FIGURES 10 and 11, it is to be emphasized that inasmuch as the fastener element with respect to which an Allen wrench is employed has a regular polygon opening, each face or side of the Allen wrench with respect to which a spring is to be used must be reduced as by milling or the like so that the Allen wrench departs from a regular polygon in transverse section to a sufficient extent that the spring placed upon the reduced side or face of the Allen wrench can be depressed to a sufficient extent that the tool in its entirety can be transversely compressed sufficiently to be received within the regular polygonal opening in the threaded fastener. The necessity for such reduction or milling away of the side or face of the Allen wrench that is to accommodate the holding spring will be evident to those skilled in the art since it is desirable that the Allen wrench make as snug a fit as possible in the regular polygon opening in the threaded fastener.

Attention is now directed to FIGURES 20 through 22 wherein there is disclosed a modified form of Allen wrench according to the present invention. Such modified form of Allen wrench is designated generally at 70 and comprises a shank 72 that is except to the extent hereinafter specified of regular polygon transverse configuration, namely, hexagonal. One end of the shank 72 is bent to define a handle 74.

The end of the shank 72 remote from the handle 74 has one side or face 76 thereof reduced or milled away to constitute a departure from the regular hexagon transverse configuration as best shown in FIGURE 22. A holding spring 78 of substantially rectangular transverse section is provided and positioned alongside the reduced or milled extent of the side 76 of the shank 72. The leaf type spring 78 has a thickness approximating but not in excess of the extent to which the side 76 is reduced to constitute a departure from a regular polygon section. The leaf type spring 78 has a width approximating but not in excess of the transverse width of the reduced side or face 76 of the shank 72. These special limitations are essential and necessary so that the shank 72 together with the leaf spring 78 can be radially or transversely compressed so as to be snugly received within a complementary opening of regular polygonal transverse configuration.

The spring 78 is seated flush against the side or face 76 at a position remote from the end 80 of the shank 72, and fixedly secured in such position by a metallic band 82 that is crimped about the shank 72 and the spring 78 as clearly shown in FIGURE 21.

FIGURE 23 shows the arcuate configuration of the leaf spring 78 when the latter is in repose and prior to attachment by means of the ring or band 82 to the shank 72. It will be noted that in repose the spring 78 is curved in one direction throughout its entire longitudinal dimension, and this results in the spring 78 having the configuration shown in FIGURE 21 on being attached to the shank 72, it being important to note that when the spring 78 is attached to the shank 72 that the spring 78 includes a first portion 84 that is slightly convex toward the side 76 so as to curve away from the side 76 and smoothly merge with the portion 86 of the spring 78 that is seated flush against the side 76 thereby establishing a position of essential tangency to the side 76 at 88. The spring 78 includes a second portion 90 that is concave towards the side 76 that smoothly merges with the portion 84 at a point of inflection 92, and the free end of the portion 90 bears against the side 76 at a position 94 that is spaced a short interval from the end 80 of the shank 72. The spring 78 immediately adjacent the position 94 extends in a direction that defines an acute angle with respect to the reduced side 76 of the shank 72. It will be evident on comparing the configurations of the spring 78 shown in FIGURES 21 and 23 that the free end of the spring 78 is stressed against the side 76 at the position 94 because of the initial curvature of the spring 78 in repose, it being noted that the application of the crimp band 82 to secure the spring 78 to the shank 72 required resilient flexure of the spring 78.

The position 94 is sufficiently spaced from the end 80 of the shank 72 to prevent the free end of the spring 78 from extending beyond the end 80 of the shank 72 when the spring 78 is flattened against the side 76 of the shank 72.

Reference is now made to FIGURE 24 for an appreciation of the action of the spring 78 in securing the shank 72 to an Allen screw 100. As the end 80 of the shank 72 is initially inserted into the hexagonal recess 102 in the Allen screw 100, no opposition to such insertion is encountered until the position 94 shown in FIGURE 21 reaches the outer end of the socket or recess 102, and it will be noted that such small degree of initial unopposed insertion serves to orient the screw 100 to the shank 72 so that their axes are in substantial alignment and with such screw 100 and shank 72 being in proper angular relationship to each other. This results in there not being any possibility of the free end of the spring 78 running directly into and blocking further ingress of the shank 72. Rather, the inclined surface of the spring 78 remote from the side 76 encounters the inner surface of the socket 102 whereupon further ingress by the shank 72 results in a camming action against the spring 78 that progressively urges flattening of the spring 78 against or closely adjacent to the side 76 of the shank 72. Such flattening of the spring 78 is accompanied by the free end of the spring 78 sliding upon the side or face 76 toward the end 80 of the shank 72.

It is extremely important in the functioning of the tool shown in FIGURES 20 through 24 that the flattening of the spring 78 against the side 76 proceeds progressively from the initial point of tangency 88 towards the end 80 rather than from the position 94. Indeed, the part of the spring 78 immediately adjacent the free end of the spring 78 is the last part thereof to flatten against the side 76, and in fact this portion usually does not fully flatten because of normal working clearances. Equally important is the fact that no portion of the spring 78 is caused to disengage from the side 76 during the flattening operation on insertion of the shank 72. These functions occur because of the spring shape and the pretensioning thereof.

Such flattening of the spring 78 described above occurs very rapidly upon ingress of the shank 72 into the socket 102, with virtually all of such flattening occurring by the time that the end 80 of the shank 72 reaching about a midway position in the depth of the recess 102 as the shank 72 is moved in the direction indicated by the arrow 104. Such rapid flattening occurs by reason of the steepness of the spring in its relation to the side 76 adjacent the position 94 as shown in FIGURE 21, it being preferred that such angle be from about 3° to 10°, though less as well as greater degrees of angularity may be employed. Such angle appears greater in the drawings as the curvature of the spring 78 is somewhat exaggerated in the drawings to make the character thereof apparent. It will be noted that although the spring 78 is spaced outwardly from the side 76 at positions substantially further spaced from the end 80 than the depth of the recess 102 in the Allen screw 100, the spring 78 essentially flattens against the side 76 throughout its extent upon insertion of the shank 72 into the recess 102, at least when the shank 72 is fully bottomed in the recess 102. Such flattening of the spring in the manner described results in the pressure exerted by the spring 78 against the Allen screw 100 in a lateral direction increasing at a rate greater than simply being linear with respect to the amount of movement of the shank 72 into the socket 102, whereby initial movement of the shank 72 into the socket 102 is easily effected and yet a very substantial degree of holding force is ultimately exerted by the spring 78 to prevent inadvertent disengagement of the screw 100 from the shank 72.

In FIGURE 12 there is disclosed an open end wrench 39 having a head 40 with flat wrench surfaces 41 for engaging a nut and with at least one of said surfaces provided with longitudinal and transverse cross grooves 42 and 43 of a depth to accommodate a holding spring 44 attached by welding 45 at its inner end and with the portion of the spring located in the intersected portion of the groove provided with a central outwardly bowed portion 46 for taking up any play or looseness between the wrench surfaces of a nut 47 to secure the nut in place. The opposite end of the wrench may be similarly constructed.

In the use of the wrench shown in FIGURES 12 through 15, the function of the spring in gripping the nut is substantially analogous to that described in considerable detail relative to the form of invention shown in FIGURES 20 through 24, it being noted that the spring rapidly is flattened against the bottom of the groove whether the nut is inserted in a direction parallel to or at right angles to the shank of the wrench. As in the case of the groove 13 discussed in connection with the embodiment of the invention shown in FIGURES 1 through 4, the bottom of the groove (both the long as well as the relatively short cross portions thereof) is continuous and free from any sharp angularities with respect to depth.

In FIGURE 16 there is disclosed a box wrench 48 having a socket composed of twelve pairs of cooperating faces 49 in at least one of which face is formed a groove 50 in which a spring 51 is secured by welding 52, said spring having a bowed portion 53 which normally extends inwardly beyond the surface on which it is disposed but capable of being compressed within such surface due to the fact that the groove is of a length and depth to accommodate such spring. As in the case of the previously described embodiments of the invention, the bottom of the groove 50 is along the extent adjacent the spring 51 continuous and free from any sharp irregularities or angularities in depth.

FIGURES 25 and 26 illustrate yet another embodiment of a box wrench according to the present invention. This modified form of box wrench is designated generally at 110, and includes a shank or handle portion 112 terminating in an integral socket member 114 having an internal 12-point configuration of conventional character except to the extent hereinafter specified. As in the case of the wrench shown in FIGURES 16 and 17, the wrench 110 is employed in applying a torque to a hexagonal nut or hexagonal bolt heads.

The embodiment of the invention shown in FIGURES 25 and 26 includes two separate springs 116 and 118, each of which is of the same general character as the previously described springs 78 and 53, two springs being employed so that however a hexagonal fastener may be engaged by the wrench 110, one of such springs will be effective to engage and hold the fastener, it being evident that two entirely distinct sets of faces come separately into play depending upon the angle at which a hexagonal fastener is received within the socket member 114.

As in the case of the embodiment of the invention shown in FIGURES 16 and 17, the faces with respect to which the springs 116 and 118 are employed are reduced or milled to afford sufficient space within which the springs may be flattened to accommodate a polygonal fastener. Preferably, the faces 120 and 122 are milled, broached or otherwise formed to include slots or grooves 124 and 126, respectively, within which the springs 116 and 118 may be accommodated when flattened. This detail of construction is best seen in FIGURE 26. The ends of the springs 116 and 118 corresponding generally in configuration to the portion 86 of the spring 78 are suitably secured as by welding or the like 128 in the grooves 124 and 126. The bottom of the grooves 124 and 126 are continuous and free from any sharp angularity as to depth, and the longitudinal configuration of the leaf springs 116 and 118 are related to the bottoms of the grooves 124 and 126 in the same manner as the spring 78 is to the side 76 of the shank 72. While the action of flattening the springs 116 and 118 is somewhat different depending upon which end of the socket member 114 the nut is inserted, the end result is the same in that the nut is securely retained therein against inadvertent detachment.

Similarly in FIGURE 18 is disclosed an 8-point socket type wrench 54 composed of eight pairs of wrench engaging faces and a polygonal wrench receiving series of faces 55, one of the latter being provided with a groove 56 and the former being provided with a groove 57 in which a leaf spring 58 is secured by welding 59 or other suitable means and such spring having an outwardly bowed portion 61 for engaging a nut.

In the embodiment of FIGURES 18 and 19 as well as in each of the preceding embodiments at least one of the wrench surfaces is provided with a spring permanently attached and which is accommodated within a groove or milled portion so that when the spring is compressed the wrench size will be unchanged.

FIGURES 27 and 28 relate to yet another embodiment of the invention, and specifically bear the same relation to the embodiment shown in FIGURES 18 and 19 as the embodiment shown in FIGURES 25 and 26 bear to the embodiment shown in FIGURES 16 and 17. In short, the embodiment of the invention shown in FIGURES 27 and 28 comprises a 8-point socket designated generally at 130 including two leaf springs whereby at least one of such leaf springs is engaged whichever of the two sets of faces may be engaged by a hexagonal nut. The socket 130 includes a pair of faces 132 and 134 in which are respectively milled flat bottomed slots 136 and 138. Arcuate leaf springs 140 and 142 are positioned adjacent to and operatively associated with the grooves 136 and 138 respectively, such springs 140 and 142 being welded or otherwise suitably secured to the socket at 144. As clearly shown in FIGURE 28 with respect to the spring 140, the spring 140 bears essentially the same relation to the flat bottom 146 of the groove 136 that the spring 78 bears to the side 76 of the shank 72 in FIGURE 21.

Attention is now directed to FIGURE 29 wherein still another embodiment of the invention is shown, this embodiment of the invention comprising a socket designated generally at 150 of conventional character (except to the extent hereinafter specified) for use in conjunction with hexagonal nuts and bolt heads. One face 152 of the socket 150 has a flat bottomed slot or groove 154 milled, broached, or otherwise formed therein. A flat leaf spring 156 is disposed adjacent to and operatively associated with the groove 154 in a manner analogous to that previously described in connection with other embodiments of the invention. One end 158 of the spring 156 is seated flush against and welded to the bottom of the groove 154. The spring 156 bears the same relation to the flat bottomed groove 154 that the spring 78 bears to the side 76 of the Allen wrench shown in FIGURE 21, it being noted that the outwardly convex portion 160 of the spring 156 is disposed outwardly from the plane of the face 152 so as to engage a fastening element received within the socket 150. In essence, the cooperation between the socket 150 including the spring 156 with a hexagonal fastening element received therein is analogous to and is indeed essentially precisely the inverse of the coaction previously described in connection with the shank 72, the spring 78 and the Allen screw 100 shown in FIGURE 24.

With respect to each of the embodiments of the invention hereinbefore described in conjunction with the accompanying drawings, the springs are preferably ferrous based and can be of the same composition as customarily employed in the main springs of conventional alarm clocks, spring motors for toys, reels and the like. However, if desired or deemed expedient, the springs can be of non-ferrous character, such as conventional copper beryllium alloys often employed in electric switches or the like as springs or resilient elements.

It will be evident to those skilled in the art that in each of the embodiments of the invention hereinbefore described the springs may be secured to other components of the tools by means other than welding or by crimped retaining bands such as shown in FIGURE 21, it being only essential that the portion of the springs indicated as being secured be firmly retained in seated engagement against the bottom of the groove or against the reduced face of the tool. For example, it will be obvious to those skilled in the art that by way of example the springs may be retained by peening or striking down the edges or sides of a groove or slot in which the spring is disposed so as to grip and retain the spring in assembled relation.

It is preferred that components of the various tools described above other than the spring components thereof be made of conventional steels employed in tools of the class to which the springs are applied.

It will be apparent from the foregoing that means is provided for holding the tools and fastening element together and in which the tool is provided with the milled or reduced portion for accommodating a holding spring of the leaf type permanently fixed thereto and having a portion projecting outwardly beyond the depth of the milled or reduced portion to which it is secured in a manner to take up looseness in the fit between the tool and the fastening element so as to retain the tool and the fastening element against inadvertent disengagement, but being compressible within such milled or reduced portion to an extent to accommodate the fastening element to which the tool is applied.

It will be obvious to one skilled in the art that various changes and departures may be made from the forms of preferred embodiments of the invention disclosed without departing from the spirit and scope thereof, and therefore the invention is not limited by that which is illustrated in the drawings and described in the specification, but only as indicated in the accompanying claim.

I claim:

In a fastener tool of the class for non-rotatably interlocking with and for turning threaded fasteners about an axis upon axial meshing of the tool with such fasteners, an improved means for opposing inadvertent dislodgment of the fastener from interlocking relationship with the tool; said means comprising said tool having a surface adapted to face toward a portion of a fastener axially meshed with the tool, said surface having an extent approximately parallel to the axis that is continuous and free of any abrupt angularities along such continuous extent, an elongated spring having a length generally corresponding to said extent of the surface, said spring being disposed along said extent and being adjacent one end thereof rigidly secured to the tool and seated flush against the surface with the spring then extending therefrom along and being internally prestressed resiliently against and in continuous engagement with said extent of the surface, then smoothly curving away from the surface, and thence smoothly curving with relatively shorter radius of curvature towards said extent of the surface to terminate in an end resiliently biased against and in sliding engagement with said extent of the surface.

References Cited by the Examiner

UNITED STATES PATENTS

| 271,549 | 1/1883 | True | 81—125 X |
|---|---|---|---|
| 532,830 | 1/1895 | Snyder. | |
| 843,693 | 2/1907 | O'Hara. | |
| 1,056,848 | 3/1913 | Starrett et al. | |
| 2,013,826 | 9/1935 | Jacobson. | |

FOREIGN PATENTS

| 886,095 | 6/1943 | France. |
|---|---|---|
| 69,290 | 1/1952 | Netherlands. |

WILLIAM FELDMAN, *Primary Examiner.*

R. V. PARKER, Jr., *Assistant Examiner.*